(12) United States Patent
    Shang

(10) Patent No.: US 10,401,914 B2
(45) Date of Patent: Sep. 3, 2019

(54) BIAXIAL HINGE AND TERMINAL DEVICE USING THE SAME

(71) Applicant: KEM HONGKONG LIMITED, Tsimshatsui Kowloon (HK)

(72) Inventor: Qilong Shang, Beijing (CN)

(73) Assignee: KEM HONGKONG LIMITED, Tsimshatsui Kowloon (HK)

( * ) Notice: Subject to any disclaimer, the term of this patent is extended or adjusted under 35 U.S.C. 154(b) by 0 days.

(21) Appl. No.: 14/729,974

(22) Filed: Jun. 3, 2015

(65) Prior Publication Data
    US 2015/0362958 A1    Dec. 17, 2015

(30) Foreign Application Priority Data
    Jun. 12, 2014    (CN) .......................... 2014 1 0259394

(51) Int. Cl.
    *G06F 1/16*    (2006.01)
    *E05D 5/04*    (2006.01)
    (Continued)

(52) U.S. Cl.
    CPC ........... *G06F 1/1681* (2013.01); *E05D 3/122* (2013.01); *E05D 5/04* (2013.01); *E05D 11/082* (2013.01);
    (Continued)

(58) Field of Classification Search
    CPC ....... G06F 1/1681; E05D 5/04; E05D 11/082; E05D 3/122; Y10T 16/54038; Y10T 16/5402; Y10T 16/54028
    See application file for complete search history.

(56) References Cited

U.S. PATENT DOCUMENTS 6,176,044 B1 * 1/2001 Nixon .................. E05F 15/614
                                                    49/334
7,140,074 B2 * 11/2006 Han ..................... H04M 1/022
                                                    16/366
(Continued)

FOREIGN PATENT DOCUMENTS

CN          1969245 A     5/2007
CN        202926866 U     5/2013
(Continued)

OTHER PUBLICATIONS

Office Action dated Jun. 20, 2017, issued in corresponding Chinese Patent Application No. 201410259394.2.
(Continued)

*Primary Examiner* — David M Sinclair
*Assistant Examiner* — Theron S Milliser
(74) *Attorney, Agent, or Firm* — Notaro, Michalos & Zaccaria P.C.

(57) ABSTRACT

A biaxial hinge in which a first casing and a second casing of a terminal device can open and close 360 degrees relative to each other, with a simplified structure, enhanced opening and closing speed and an improved operability. A first hinge shaft attached to the second casing via a first attaching plate is rotatable in parallel to a second hinge shaft attached to the first casing via a second attaching plate with help of several joint members. A module for restricting rotation of the first hinge shaft and the second hinge shaft is provided in association with the joint members. The module for restricting rotation includes modules for generating friction torque, modules for sucking, stopper modules for restricting a rotation angle of the first hinge shaft and the second hinge shaft, and a module for synchronously rotating hinge shafts.

7 Claims, 14 Drawing Sheets

(51) Int. Cl.
*E05D 11/08* (2006.01)
*E05D 3/12* (2006.01)
(52) U.S. Cl.
CPC ...... *Y10T 16/5402* (2015.01); *Y10T 16/54028* (2015.01); *Y10T 16/54038* (2015.01)

(56) References Cited

U.S. PATENT DOCUMENTS

| | | | |
|---|---|---|---|
| 7,155,266 B2 | 12/2006 | Stefansen | |
| 2002/0038493 A1* | 4/2002 | Ko | H04N 5/2251 16/303 |
| 2004/0266239 A1* | 12/2004 | Kurokawa | G06F 1/1618 439/165 |
| 2005/0050686 A1* | 3/2005 | Kurokawa | G06F 1/1618 16/354 |
| 2005/0117284 A1* | 6/2005 | Kida | G06F 1/1616 361/679.27 |
| 2006/0238968 A1* | 10/2006 | Maatta | H04M 1/0218 361/679.01 |
| 2007/0226955 A1* | 10/2007 | Cho | E05D 3/122 16/354 |
| 2008/0242359 A1* | 10/2008 | Seol | G06F 1/1616 455/566 |
| 2011/0289728 A1* | 12/2011 | Wang | E05D 3/122 16/337 |
| 2012/0096678 A1* | 4/2012 | Zhang | G06F 1/1681 16/302 |
| 2013/0016492 A1* | 1/2013 | Wang | E05D 3/18 361/820 |
| 2013/0139355 A1* | 6/2013 | Lee | H04M 1/022 16/354 |
| 2013/0322004 A1* | 12/2013 | Park | F16C 11/10 361/679.27 |
| 2014/0360296 A1* | 12/2014 | Hsu | G06F 1/1616 74/98 |
| 2015/0047152 A1* | 2/2015 | Cheng | E05D 3/122 16/354 |
| 2015/0159413 A1* | 6/2015 | Chen | E05D 3/122 16/342 |
| 2015/0342068 A1* | 11/2015 | Su | G06F 1/1681 16/354 |
| 2016/0010374 A1* | 1/2016 | Hsu | G06F 1/16 74/414 |
| 2016/0011632 A1* | 1/2016 | Hsu | E05D 3/122 16/354 |
| 2016/0102487 A1* | 4/2016 | Kuramochi | E05D 3/12 361/679.27 |

FOREIGN PATENT DOCUMENTS

| | | | | |
|---|---|---|---|---|
| CN | 103455101 A | | 12/2013 | |
| JP | 2004204983 A | | 7/2004 | |
| JP | 2009-063039 | | 3/2009 | |
| JP | 2015-105693 | | 11/2013 | |
| TW | 388580 U | | 9/2010 | |
| TW | M416976 U | | 11/2011 | |
| TW | M452593 U | | 5/2013 | |
| TW | M468131 U | * | 12/2013 | ............... H05K 7/14 |
| TW | M477134 U | | 4/2014 | |

OTHER PUBLICATIONS

Office Action dated Feb. 24, 2018, issued in corresponding Chinese Patent Application No. 201410259394.2.
Office Action dated Oct. 13, 2016, issued in corresponding Taiwan Patent Application No. 104117529.
Office Action dated Jun. 2, 2017, issued in corresponding Taiwan Patent Application No. 104117529.

* cited by examiner

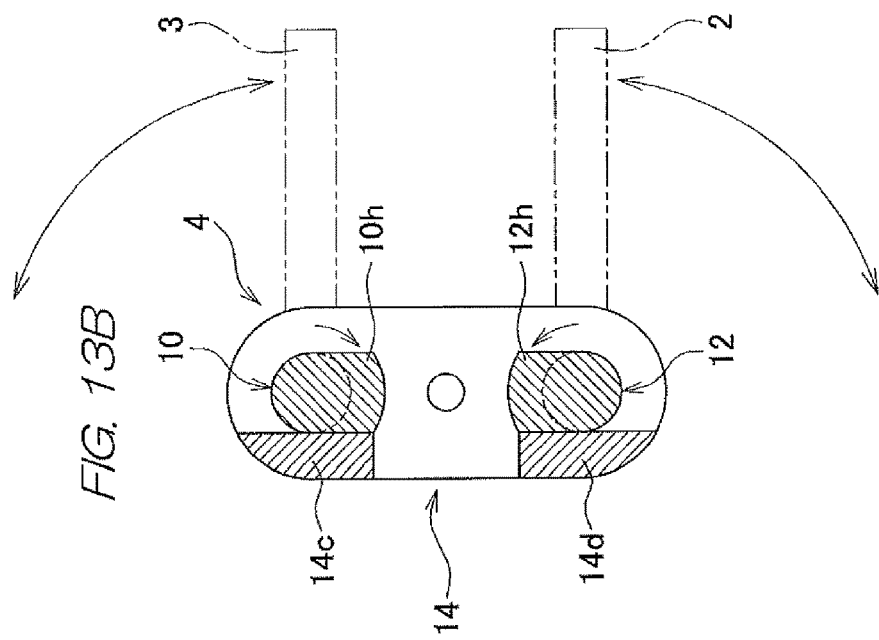
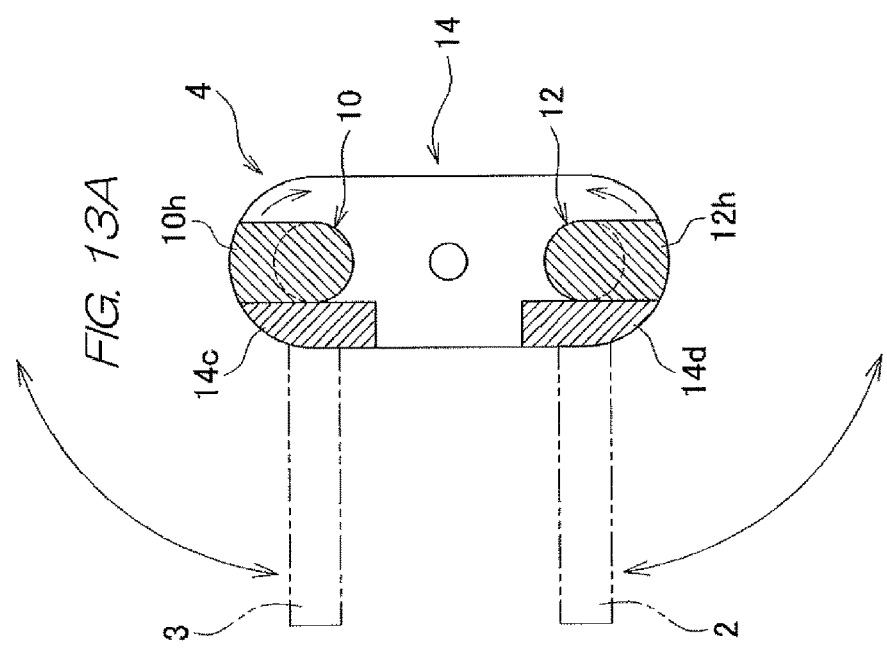

BIAXIAL HINGE AND TERMINAL DEVICE USING THE SAME

FIELD OF THE INVENTION

The present invention relates to a biaxial hinge suitably used in opening and closing a first casing relative to a second casing of a terminal device such as a notebook PC, a mobile PC and a PDA.

BACKGROUND ART

Among terminal devices, such as notebook PC, mobile PC and PDA, which comprise a first casing provided with a keyboard portion and a second casing provided with a display portion, uniaxial hinges are sometimes used, wherein the hinges connect the first casing and the second casing, such that both casings can open and close in an upward and downward direction; in other cases biaxial hinges are employed, wherein each of the hinges comprises two axes, wherein the second casing can further rotate with regard to the first casing in a horizontal direction, after the former opens 90 to 180 degrees relative to the latter. The present invention relates to the biaxial hinge of these categories.

Conventionally, a biaxial hinge of the above-mentioned structure is known, such as the one disclosed in JP Laid-Open Patent Application No. 2009-063039. The biaxial hinge according to the patent document is characterized in that a shaft attached to a first member (first casing) is connected to a further shaft attached to a second member (second casing) via a joint arm, and that a mechanism for generating friction torque is provided on each shaft, and that a link arm is provided; however, the hinge is not so designed that the first member can open more than 180 degrees relative to the second member.

Therefore, a parent company of this Applicant has proposed a biaxial hinge which can meet the above-mentioned requirements (JP Patent Application No. 2013-247542). The configuration of the biaxial hinge is characterized in that a first hinge shaft attached to the first casing side is coupled in parallel to a second hinge shaft attached to the second casing side, via a first joint member and a second joint member; that the first hinge shaft and the second hinge shaft are provided such that the former can rotate relative to the latter; and that a first mechanism for selectively restricting rotation and a second mechanism for selectively restricting rotation are provided between the first hinge shaft and the second hinge shaft, wherein the first mechanism selectively allow the first hinge shaft to rotate and the second mechanism have similar functions on the second hinge shaft; the first and the second mechanism for selectively restricting rotation are constructed such that both mechanism allow the first and the second casings to open and close in a prescribed sequence between the closed state at 0 degree and the opened state at 360 degrees.

In the above-mentioned prior art, a first mechanism for selectively restricting rotation comprises a locking member provided between a second joint member and a slide guide member, such that the locking member can slide in an upward and downward direction between a first hinge shaft and a second hinge shaft, wherein the locking member comprises a first cam convex portion in an upper portion and a second cam convex portion in a lower portion; a first mechanism for selectively restricting rotation further comprises a first A locking cam member having a first A cam concave portion and a first B cam concave portion, wherein the first A locking cam member is provided above said locking member, and wherein the first hinge shaft passes through and engages with the first locking cam member, and a first B locking cam member having a second A cam concave portion and a second B cam concave portion, wherein the first B locking cam member is provided below the locking member, wherein the second hinge shaft passes through and engages with the first B locking cam member. On the other hand, a second mechanism for selectively restricting rotation comprises a second A locking cam member attached to the first hinge shaft, wherein a rotation of the second A locking cam member is restrained by the first hinge shaft; a second B locking cam member attached to the second hinge shaft, wherein a rotation of the second B locking cam member is restrained by the second hinge shaft; a movement stopper rotatably provided between the second A locking cam member and the second B locking cam member, wherein the movement stopper engages with the second A locking cam member and the second B locking cam member, under specific conditions depending on a rotation angle of the movement stopper; a first stopper lever rotatably attached to the first hinge shaft to engage with the movement stopper, wherein the first stopper lever is brought into a pressurized contact with the second A locking cam member; and a second stopper lever rotatably attached to the second hinge shaft to engage with the movement stopper, wherein the second stopper lever is brought into a pressurized contact with the second B locking cam member.

However, a further problem arises, in that there are too many components involved and the structure is too complex, which leads to a high manufacturing cost. A manufacturer of terminal devices such as notebook PC would set very strict demands for reducing the costs of the components of the terminal devices.

SUMMARY OF THE INVENTION

Therefore, an object of the invention is to provide a biaxial hinge in which a first casing and a second casing can open and close 360 degrees relative to each other, with a simplified structure, an enhanced opening and closing speed and an improved operability.

To achieve the above-mentioned object, a biaxial hinge according to the first aspect of the invention allows a first casing and a second casing to open and close relative to each other. In such biaxial hinge, a first hinge shaft attached to the second casing via a first attaching plate can rotate in parallel to said second hinge shaft attached to said first casing via a second attaching plate with help of a plurality of joint members, and a mechanism for restricting rotation is provided in association with the joint members. The biaxial hinge is characterized in that the mechanism for restricting rotation comprises: mechanism for generating friction torque, wherein one is provided on the first hinge shaft and other on the second hinge shaft; mechanism for sucking, wherein one is provided on the first hinge shaft and other on the second hinge shaft; stopper portion, wherein one is provided on the first hinge shaft and other on the second hinge shaft, for restricting a rotation angle of the first hinge shaft and the second hinge shaft; and a mechanism for synchronously rotating which allows one hinge shaft to synchronously rotate with a rotation of other hinge shaft, such that one hinge shaft rotates in a direction opposite to other hinge shaft.

Here, the present invention can be designed such that a mechanism for synchronously rotating comprises a first gear attached to the first hinge shaft, wherein a rotation of the first gear is restrained, and a second gear meshed with the first hinge shaft and attached to the second hinge shaft, wherein a rotation of the second gear is restrained.

Still further, the present invention can be designed such that a mechanism for synchronously rotating comprises a first gear attached to the first hinge shaft, wherein a rotation of the first gear is restrained, and a second gear meshed with the first hinge shaft and attached to the second hinge shaft, wherein a rotation of the second gear is restrained, and an intermediate gear provided between said first gear and said second gear and mechanism conveying a rotation of one gear to other gear, in order to rotate the first gear and the second gear in different directions.

Still further, a biaxial hinge according to the present invention is characterized in that the stopper portion consists of a first stopper portion and a second stopper portion. The first stopper portion comprises: a first A bearing hole provided in an upper part of a stopper plate member also functioning as a first joint member, wherein the first hinge shaft passes through the first A bearing hole, such that the first hinge shaft can rotate; a first stopper projection provided on the outside of the first A bearing hole; and a first projection provided on the first hinge shaft side, wherein the first projection abuts against the first stopper projection or not, depending on a rotation angle of the first hinge shaft. On the other hand, the second stopper portion comprises: a first B bearing hole provided in a lower position of the stopper plate member also functioning as the first joint member, wherein the second hinge shaft passes through said first B bearing hole, such that the second hinge shaft can rotate; a second stopper projection provided on the outside of the first B bearing hole; and a second projection provided on the second hinge shaft, wherein the second projection abuts against the second stopper projection or not, depending on a rotation angle of the second hinge shaft.

Still further, a biaxial hinge according to the present invention is characterized in that mechanism for generating friction torque consists of a first mechanism for generating friction torque and a second mechanism for generating friction torque. The first mechanism for generating friction torque comprises: a first friction washer attached to the first hinge shaft, wherein a rotation of the first friction washer is restrained and wherein the first friction washer is provided between a gear supporting member also functioning as second joint member and a cam plate member also functioning as third joint member; and a first elastic member provided for bringing the gear supporting member and the cam plate member into pressurized contact with the first friction washer. On the other hand, the second mechanism for generating friction torque comprises: a second friction washer attached to the second hinge shaft, wherein a rotation of said second friction washer is restrained and wherein the second friction washer is provided between a gear supporting member also functioning as second joint member and a cam plate member also functioning as third joint member; and a second elastic member provided for bringing the gear supporting member and the cam plate member into pressurized contact with the second friction washer.

Still further, a biaxial hinge according to the present invention is characterized in that the mechanism for sucking consists of a first mechanism for sucking and a second mechanism for sucking. The first mechanism for sucking comprises: a first A cam concave portion and a first B cam concave portion, each having a substantially circular arc shape, provided outside on one side of said third A bearing hole of a cam plate member also functioning as third joint member, wherein first hinge shaft rotatably passes through the third A bearing hole; a first cam follower comprising a first A cam convex portion and a first B cam convex portion on a side facing the first A cam concave portion and the first B cam concave portion, wherein a rotation of the first cam follower is restrained by the first hinge shaft, such that the first cam follower is attached to the first hinge shaft; and a first elastic member for bringing the first A cam concave portion into a pressurized contact with the first A cam convex portion on one hand, and the first B cam concave portion into a pressurized contact with the first B cam convex portion on the other. On the other hand, the second mechanism for sucking comprises: a second A cam concave portion and a second B cam concave portion, each having a substantially circular arc shape, provided outside on one side of the third B bearing hole of a cam plate member also functioning as third joint member, wherein the second hinge shaft rotatably passes through the third B bearing hole; a second cam follower comprising a second A cam convex portion and a second B cam convex portion on a side facing the second A cam concave portion and the second B cam concave portion, wherein a rotation of the second cam follower is restrained by the second hinge shaft, such that the second cam follower is attached to the second hinge shaft; and a second elastic member for bringing the second A cam concave portion into a pressurized contact with the second A cam convex portion on one hand, and the second B cam concave portion into a pressurized contact with the second B cam convex portion on the other.

Still further, a terminal device according to the seventh aspect is characterized in that it uses the biaxial hinge as described in the foregoing.

The invention is structured as described in the foregoing, so that the biaxial hinge according to the first aspect of the invention can have an operation and effect that a stopper portion can restrict a respective rotation of a first and a second hinge shafts up to a prescribed rotation angle; that a mechanism of generating friction torque can generate a friction torque to stably stop a first and a second casings at any opening and closing angle during their opening and closing operation; that a mechanism for sucking can help the first and the second casings to automatically rotate slightly before the fully opened and fully closed state, so that it helps the first and the second casings to automatically close and maintains their closed state, or it helps the first and the second casings to automatically open and maintains their opened state; and that a mechanism for synchronously rotating can open and close one casing at the same time as another casing, when the latter is opened and closed.

Still further, the present invention can provide the terminal device which enables the first casing and the second casing to synchronously open and close over a total maximum range of 360 degrees.

BRIEF DESCRIPTION OF THE DRAWINGS

FIG. 13 is an explanatory view of a stopper portion of a biaxial hinge according to the invention, FIG. 13A showing it when a first casing is closed relative to a second casing, and FIG. 13B when both a first casing and a second casing are respectively opened 180 degrees from their original position.

EMBODIMENTS

Hereinafter, based on the drawings, reference is made to the embodiments in which a biaxial hinge according to the invention is applied to a notebook PC as an example of terminal devices. The biaxial hinge according to the invention is not limited to application in a notebook PC, but also applicable to terminal devices, such as a mobile PC, PDA and others, comprising a first casing and a second casing which are coupled to each other, such that the casings can open and close in a range of 180 degrees or more in an upward and downward direction.

Embodiment 1

Figure 1A:
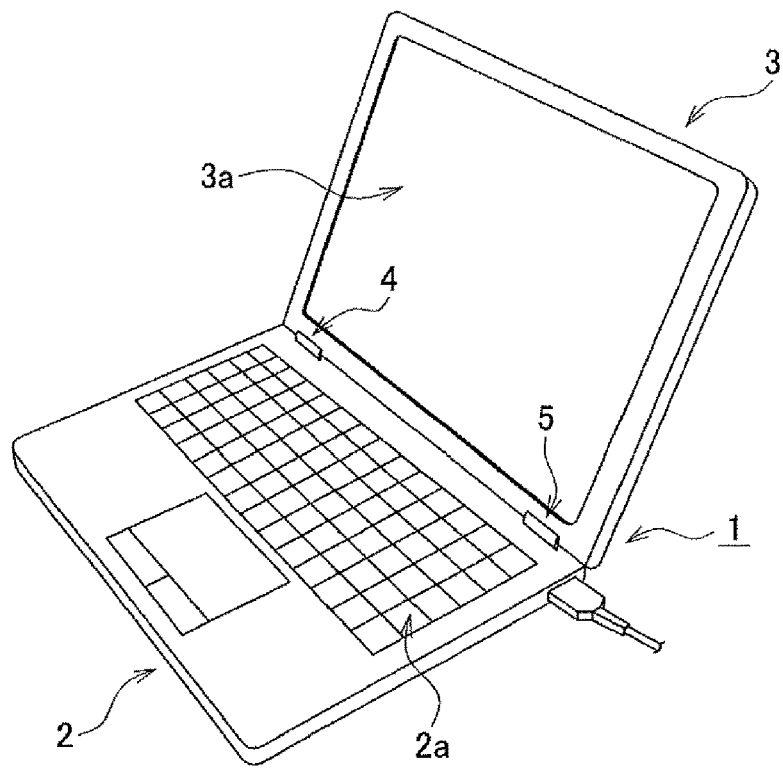
FIG. 1 show a notebook PC being an example of a terminal device, to which a biaxial hinge according to the invention is attached, FIG. 1A being a perspective view of the notebook PC (as seen from the front side) in a state in which a second casing is opened relative to a first casing, FIG. 1B a perspective view of the notebook PC (as seen from the rear side) in a state in which a first casing is closed relative to a second casing.
Figure 1B:
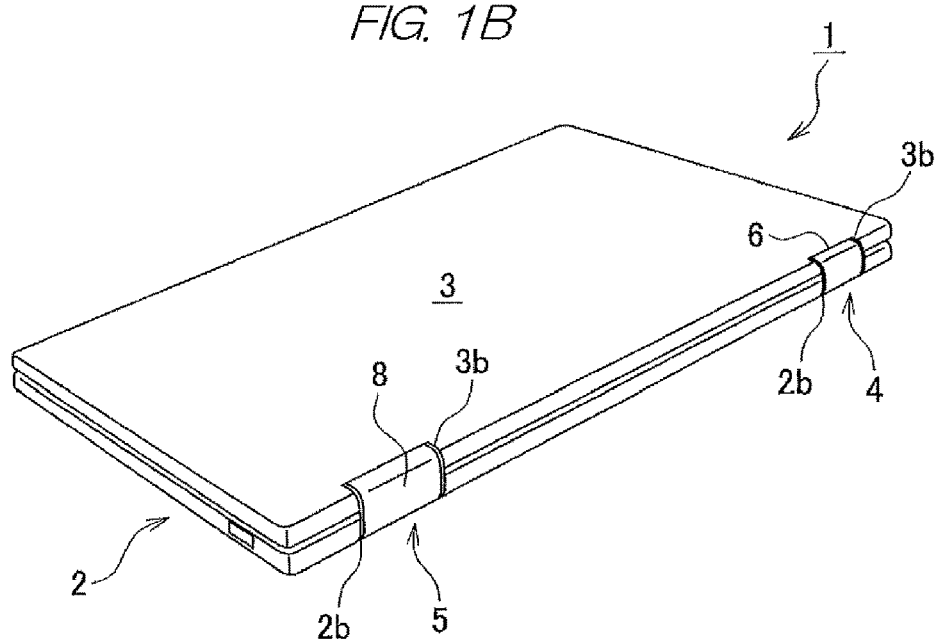

FIGS. 1A and 1B show a notebook PC 1 being an example of a terminal device using a biaxial hinge according to the invention. The notebook PC 1 comprises a first casing 2 provided with a key board portion 2a and a second casing 3 provided with a display portion 3a, and the casings are coupled via a pair of biaxial hinges 4 and 5 to each other at spots on the right and left sides of their respective rear portions such that the casings can open and close.

Since both biaxial hinges 4 and 5 have an identical structure, reference will be exclusively made to a biaxial hinge 4 in the following, and not to other biaxial hinge 5. Of course, biaxial hinge denoted with reference numeral 5 can be manufactured in a manner different from the biaxial hinge 4, as long as no inconvenience occurs in their operation.

Figure 2:
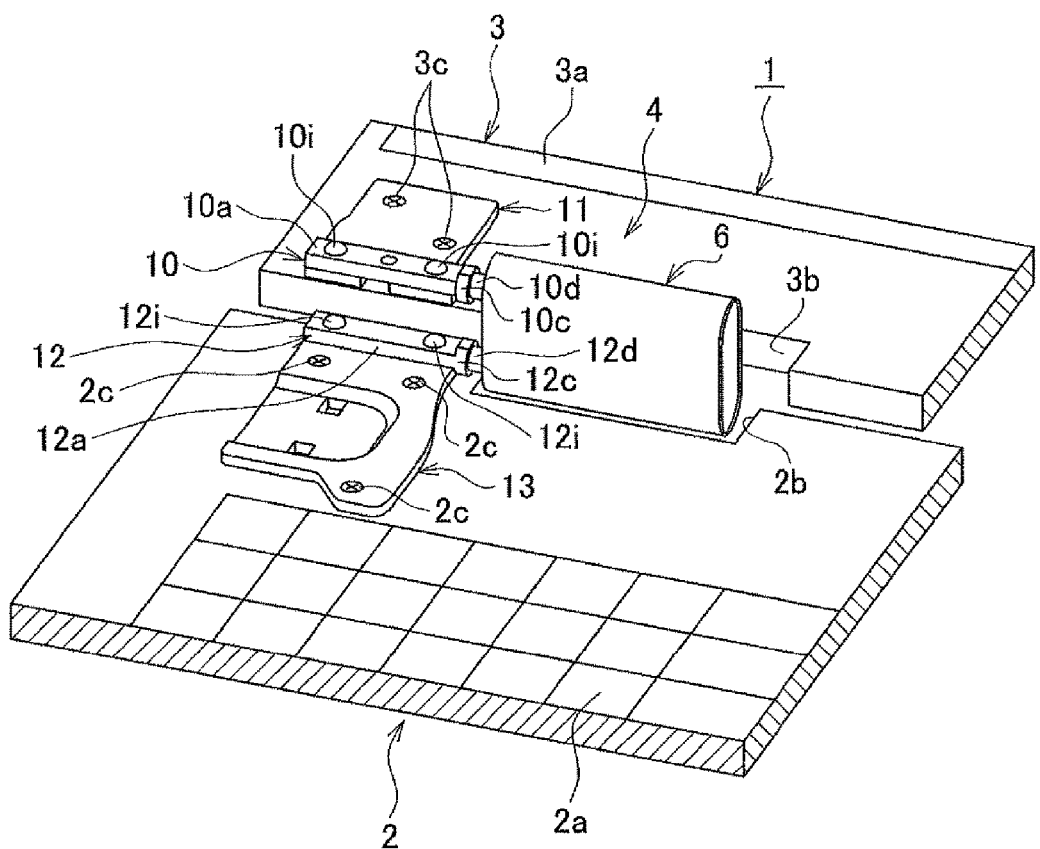
FIG. 2 is an explanatory view for explaining a biaxial hinge according to the invention as attached to a terminal device.
Figure 3:
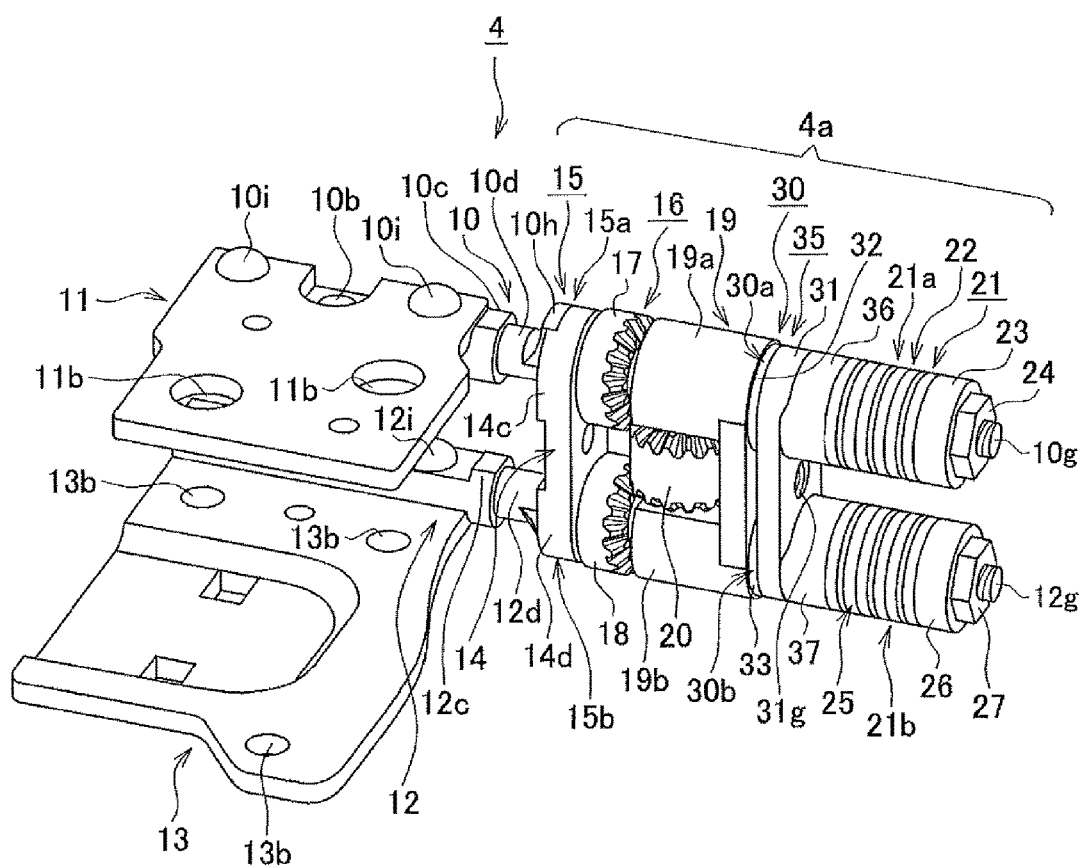
FIG. 3 is a perspective view of a biaxial hinge according to the invention.
Figure 4:
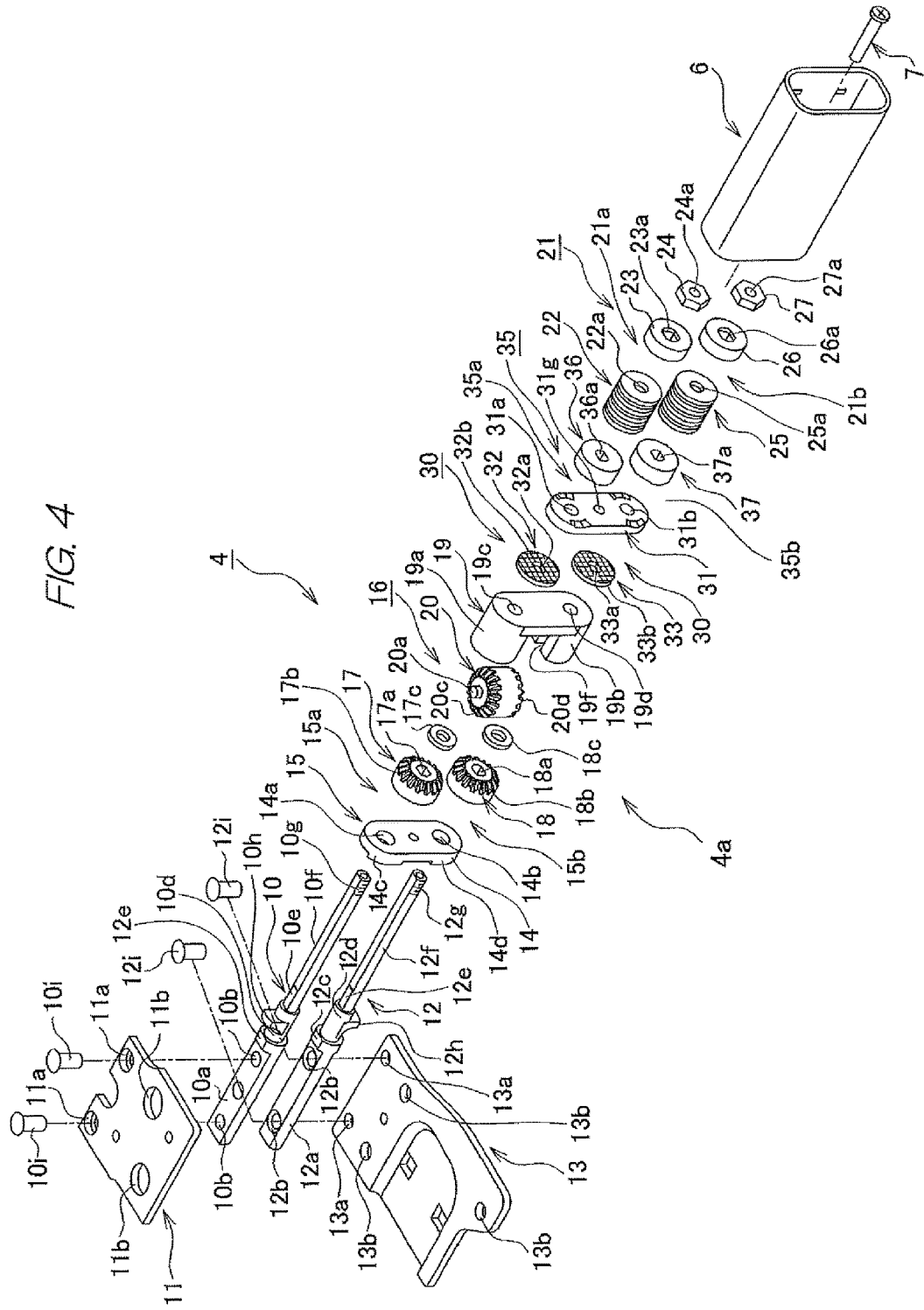
FIG. 4 is an exploded perspective view of a biaxial hinge according to the invention.
Figure 5:
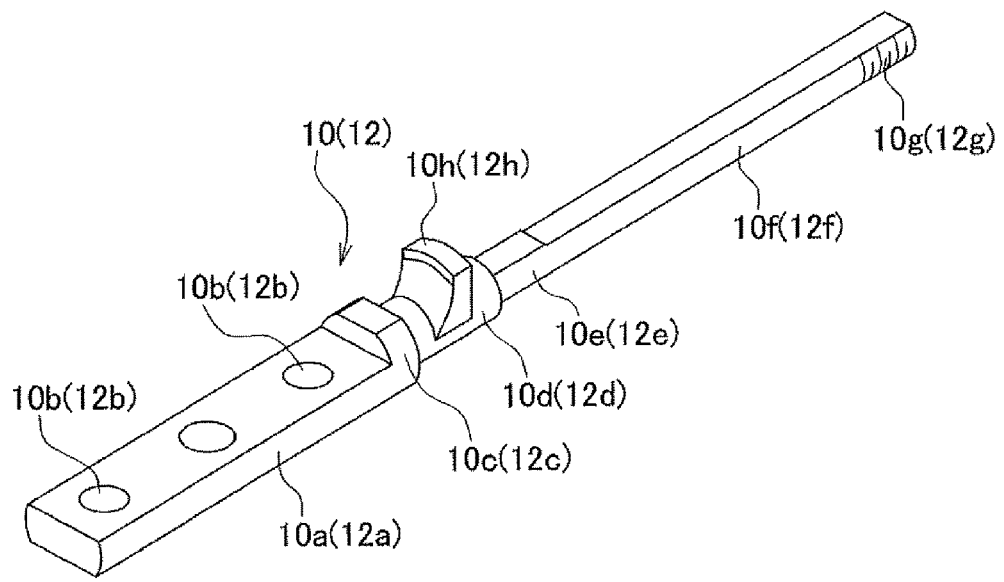
FIG. 5 is an enlarged perspective view of a first hinge shaft and a second hinge shaft of a biaxial hinge according to the invention.
Figure 6:
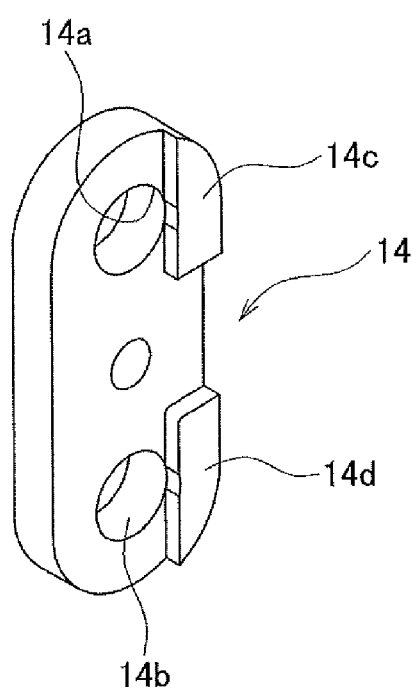
FIG. 6 is an enlarged perspective view of a stopper plate member also functioning as a first joint member of a stopper portion of a biaxial hinge according to the invention.

FIGS. 2 to 12 show an embodiment of a biaxial hinge 4 according to the invention. Specifically in FIGS. 2 to 5, a reference numeral 10 and 12 denote a first hinge shaft and a second hinge shaft, respectively. These two elements have identical structure, except that a first hinge shaft 10 has one more attaching holes 10b than attaching holes 12b of a second hinge shaft 12. Therefore, the first hinge shaft 10 is shown in FIG. 5, and as per the second hinge shaft 12, its reference numeral only appears in parentheses next to the reference numeral 10. First, reference is made to a structure of a first hinge shaft 10: the first hinge shaft comprises, as seen from one end in particular as shown in FIGS. 4 and 5, an attaching plate portion 10a having a substantially flat cross section, wherein attaching holes 10b, 10b, 10b are provided on its surface; a flange portion 10c provided next to the attaching plate portion 10a; a circular shaft portion 10d provided next to the flange portion 10c; a first deformed shaft portion 10e provided next to the circular shaft portion 10d and having a substantially elliptic cross section with a slightly smaller diameter than the circular shaft portion 10d; a second deformed shaft portion 10f provided next to the first deformed shaft portion 10e and having a substantially elliptic cross section with a slightly smaller diameter than the first deformed shaft portion 10e; a male screw portion 10g provided next to the second deformed shaft portion 10f; and a first projection portion 10h provided on an outer circumference of the circular shaft portion 10d.

As shown in FIGS. 2 to 4, a first attaching plate 11 is attached to an attaching plate portion 10a; as per mode of attaching, the former is attached to the latter by caulking respective ends of flanged attaching pins 10i, 10i, as the attaching pins pass through two attaching holes 10b, 10b of three attaching holes 10b, 10b, 10b of a first hinge shaft 10 and attaching holes 11a, 11a of the first attaching plate 11. And then, especially as shown in FIG. 2, the first attaching plate 11 is attached using attaching screws 3c, 3c to a lower surface side of a second casing 3 via attaching holes 11b, 11b of the first attaching plate 11. In the meantime, attaching screws can be used instead of the attaching pins 10i, 10i.

Next, as shown in FIGS. 2 to 5 as well, a reference numeral 12 denotes a second hinge shaft, which is placed in parallel to a first hinge shaft 10 in upward and downward direction. The second hinge shaft 12 comprises, as seen from one end in particular as shown in FIGS. 4 and 5, an attaching plate portion 12a having a substantially flat cross section, wherein attaching holes 12b, 12b are provided on its surface; a flange portion 12c provided next to the attaching plate portion 12a; a circular shaft portion 12d provided next to the flange portion 12c; a first deformed shaft portion 12e provided next to the circular shaft portion 12d and having a substantially elliptic cross section with a slightly smaller diameter than the circular shaft portion 12d; a second deformed shaft portion 12f provided next to the first deformed shaft portion 12e and having a substantially elliptic cross section as well, but with a smaller diameter than the first deformed shaft portion 12e; a male screw portion 12g provided next to the second deformed shaft portion 12f; and a second projection 12h provided on an outer circumference of the circular shaft portion 12d.

As shown in FIGS. 2 to 4, a second attaching plate 13 is attached to an attaching plate portion 12a; as per mode of attaching, the former is attached to the latter by caulking respective ends of flanged attaching pins 12i, 12i as the attaching pins pass attaching holes 12b, 12b of a second hinge shaft 12 and attaching holes 13a, 13a of the second attaching plate 13. And then, the second attaching plate 13 is attached using attaching screws 2c, 2c to an upper surface side of a first casing 2 via attaching holes 13b, 13b of the second attaching plate 13. In the meantime, attaching screws can be used instead of the attaching pins 12i, 12i.

Next, reference is made to a mechanism for controlling rotation 4a provided between a first hinge shaft 10 and a second hinge shaft 12, and in particular its components will be described one after another in the following. The mechanism for controlling rotation 4a consists of a stopper portion 15, a mechanism for synchronously rotating 16, an elastic member 21, a mechanism for generating friction torque 30 and a mechanism for sucking 35. First, reference is made to the stopper portion 15 for restricting a rotation angle of the first hinge shaft 10 and the second hinge shaft 12. The stopper portion 15 comprises a first stopper portion 15a and a second stopper portion 15b, as shown in FIGS. 3, 4 and 13. The first stopper portion 15a comprises a first A bearing hole 14a being a part of a stopper plate 14 also functioning as a first joint member, wherein the first A bearing hole 14a bears a circular shaft portion 10d of a first hinge shaft 10 such that the circular shaft portion can rotate; a first stopper projection 14c provided on the outside of the first A bearing hole 14a; and a first projection 10h provided on an outer circumference of the circular shaft portion 10d of the first hinge shaft 10. The first stopper portion 15a thus restricts a range of the rotation angle of the first hinge shaft 10 up to 180 degrees. The second stopper portion 15b comprises a first B bearing hole 14b being a part of a stopper plate 14 also functioning as a first joint member, wherein the first B bearing hole 14b bears a circular shaft portion 12d of a second hinge shaft 12 such that the circular shaft portion can rotate; a second stopper projection 14d provided on the outside of the first B bearing hole 14b; and a second projection 12h provided on an outer circumference of the circular shaft portion 12d of the second hinge shaft 12. The second stopper portion 15b thus restricts a range of the rotation angle of the second hinge shaft 12 up to 180 degrees.

Figure 7:
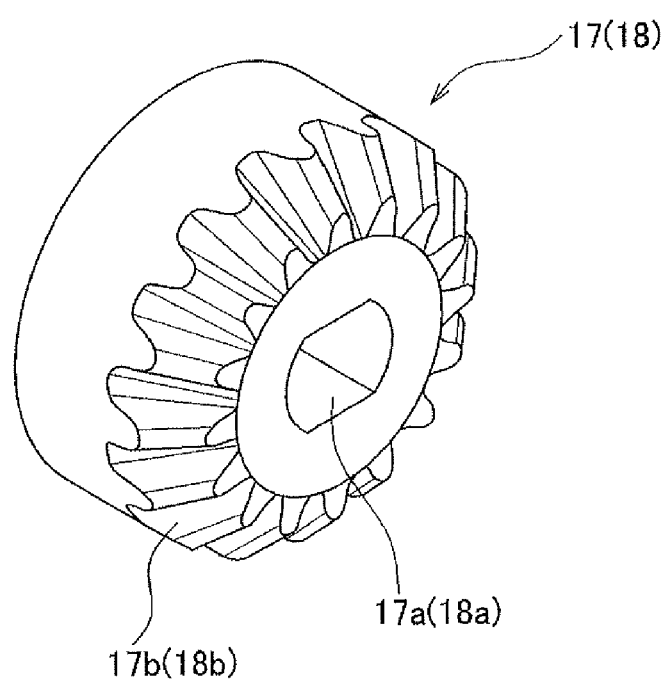
FIG. 7 is an enlarged perspective view of a first gear and a second gear of a biaxial hinge according to the invention.
Figure 8A:
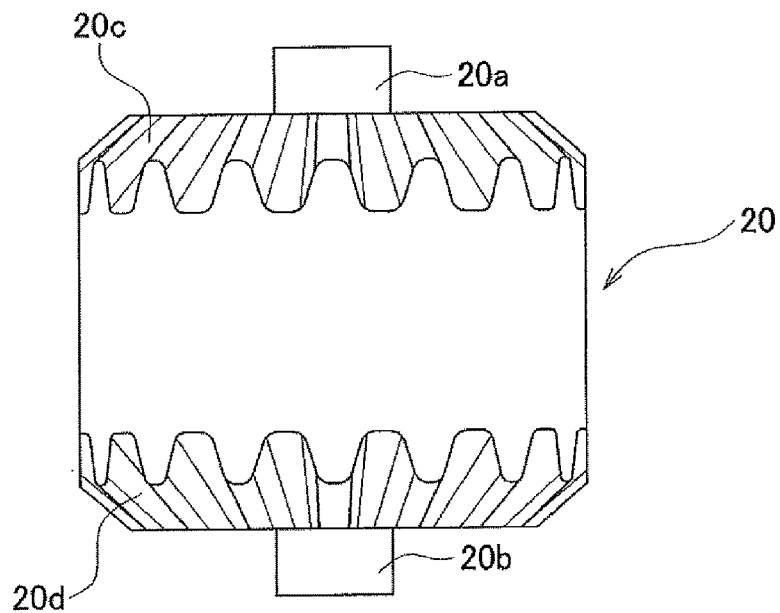
FIG. 8 show an intermediate gear of a biaxial hinge according to the invention, FIG. 8A being an enlarged elevation view and FIG. 8B being an enlarged perspective view thereof.
Figure 8B:
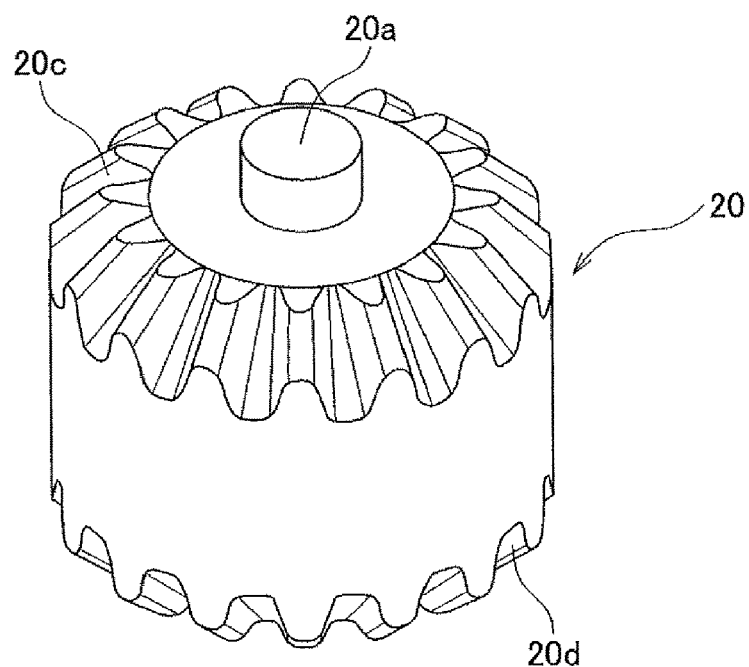
Figure 9:
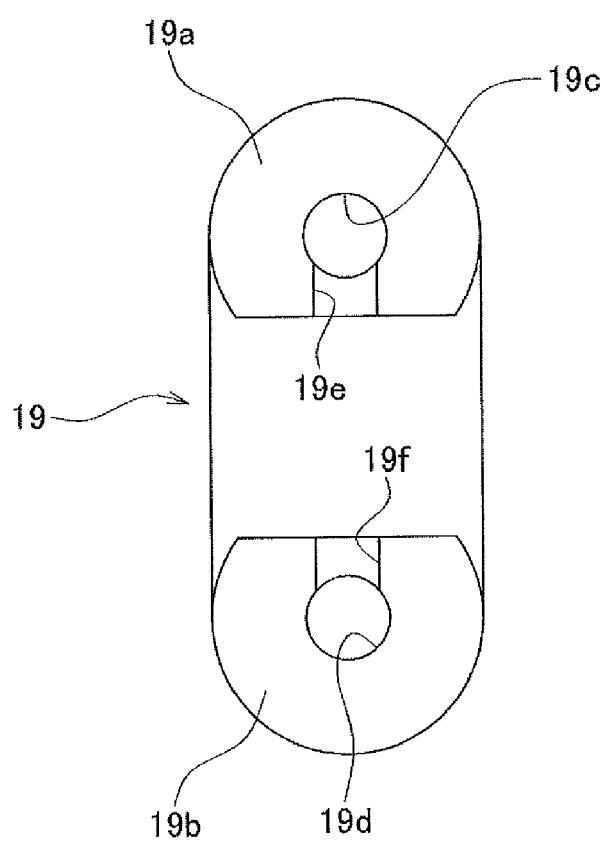
FIG. 9 is an enlarged side view of a gear supporting member of a biaxial hinge according to the invention.
Figure 10A:
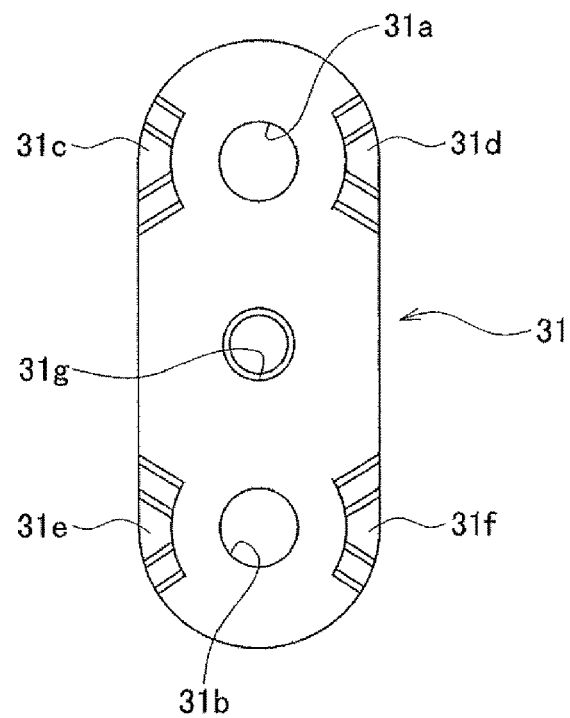
FIG. 10 show a cam plate member of a biaxial hinge according to the invention, FIG. 10A being an enlarged side view and FIG. 10B being an enlarged elevation view thereof.
Figure 10B:
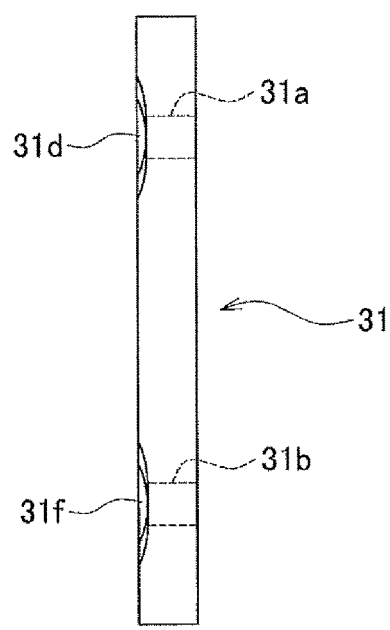
Figure 11A:
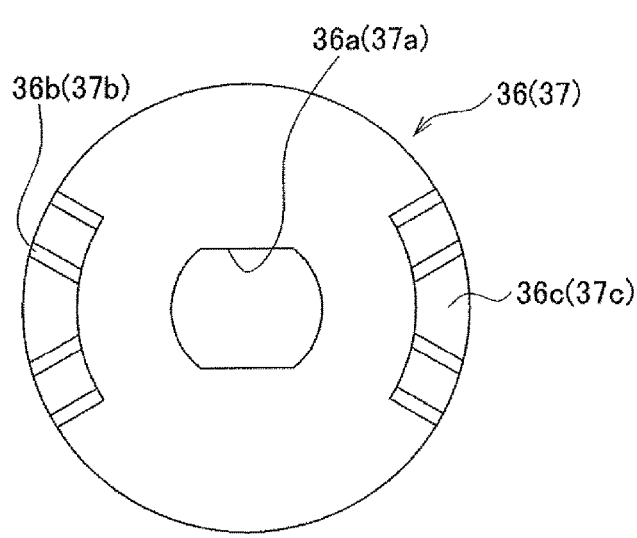
FIG. 11 show a first cam follower and a second cam follower of a biaxial hinge according to the invention, FIG. 11A being an enlarged left side view, FIG. 11B being an enlarged elevation view and FIG. 11C being an enlarged plan view thereof.
Figure 11B:
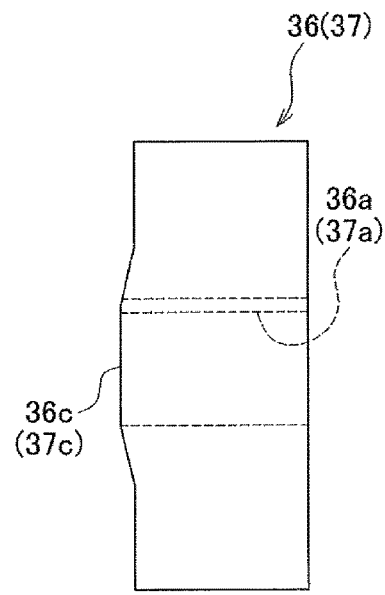
Figure 11C:
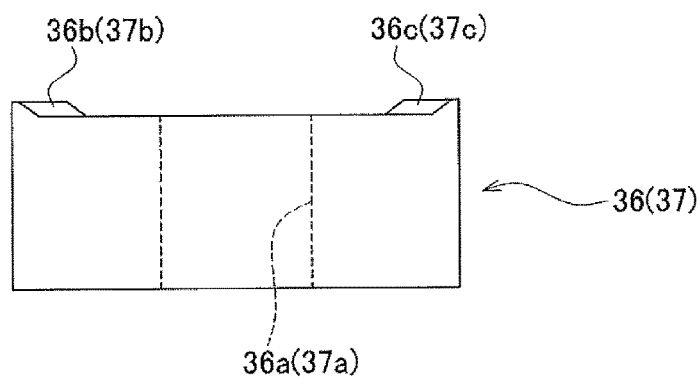

Next, reference is made to a mechanism for synchronously rotating 16 provided next to a stopper portion 15. As shown in particular in FIGS. 3 and 4, the mechanism for synchronously rotating 16 comprises a first gear 17 being a bevel gear, wherein a first deformed shaft portion 10e of a first hinge shaft 10 passes through a deformed insertion hole 17a provided in an axial direction on the center of the first gear, such that the first deformed shaft portion engages with the deformed insertion hole; and a second gear 18 being a bevel gear, wherein a first deformed shaft portion 12e of a second hinge shaft 12 passes through a deformed insertion hole 18a provided in an axial direction on the center of the second gear, such that the first deformed shaft portion engages with the deformed insertion hole. The mechanism for synchronously rotating 16 further comprises a gear supporting member 19 also functioning as a second joint member and comprising a second A bearing hole 19c and a second B bearing hole 19d, wherein the second A bearing hole is provided on an upper projecting portion 19a and the second B bearing hole is provided on a lower projecting portion 19b, the former is provided at an upper part of the gear supporting member and the latter at its lower part, both the projecting portions facing one side, and wherein a second deformed shaft portion 10f of a first hinge shaft 10 passes through the first A bearing hole, while a second deformed shaft portion 12f of a second hinge shaft 12 passes through the first A bearing hole. The mechanism for synchronously rotating 16 further comprises an intermediate gear 20 comprising an upper supporting shaft 20a provided coaxially with a first shaft supporting groove 19e provided on a lower side of the upper projecting portion 19a of the gear supporting member 19, a lower supporting shaft 20b provided coaxially with a second shaft supporting groove 19f provided on an upper side of the lower projecting portion 19b of the gear supporting member 19, an upper bevel tooth portion 20c provided at an upper part of the intermediate gear and a lower bevel tooth portion 20d provided at a lower part of the intermediate gear, wherein the upper supporting shaft 20a is rotatably supported by the first shaft supporting groove, while the lower supporting shaft 20b—by the second shaft supporting groove, and wherein the first gear 17 meshes with the upper bevel tooth portion 20c, while the second gear 18 with the lower bevel tooth portion 20d. In the meantime, the first gear 17 and the second gear 18 have an identical structure, so the first gear 17 only is shown in FIG. 7, the reference numeral for the second gear 18 in parentheses being just attached thereto. Still further, reference numerals 17c and 18c denote slip washers.

Next, reference is made to an elastic member 21 provided on the tip side of a biaxial hinge 4. The elastic member 21 consists of a first elastic member 21a on the first hinge shaft 10 side and a second elastic member 21b on the second hinge shaft 10 side. The first elastic member 21a comprises a first elastic member 22 consisting of a plurality of disc springs, spring washers or the like, wherein a second deformed shaft portion 10f of a first hinge shaft 10 passes through a circular insertion hole 22a provided in the first elastic member, and then the disc springs overlap each other; a first backing washer 23 provided next to the first elastic member 22, wherein the second deformed shaft portion 10f passes through a deformed insertion hole 23a of the first backing washer to engage with the deformed insertion hole; and a first fastening nut 24 provided next to the first backing washer 23, wherein a male screw portion 10g of the first hinge shaft 10 is screwed into a female screw hole 24a of the first fastening nut.

The second elastic member 21b comprises a second elastic member 25 consisting of a plurality of disc springs, spring washers and the like, wherein a second deformed shaft portion 12f of a second hinge shaft 12 passes through a circular insertion hole 25a provided in the second elastic member, and then the disc springs and the like overlap each other; a second backing washer 26 provided next to the second elastic member 25, wherein the second deformed shaft portion 12f pass through and engage with a deformed insertion hole 26a of the second backing washer; and a second fastening nut 27 provided next to the second backing washer 26, wherein a male screw portion 12g of the second hinge shaft 12 is screwed into a female screw hole 27a of the second fastening nut.

As described below, an elastic member 21 as described above applies a pressure contact force to a mechanism for generating friction torque 30 and a mechanism for sucking 35, so that the former can exert a friction function while the latter a sucking function, when a first hinge shaft 10 and a second hinge shaft 12 rotate respectively.

Next, reference is made to a mechanism for generating friction torque 30. As shown in particular in FIGS. 3 and 4, the mechanism for generating friction torque 30 and a mechanism for sucking 35 are provided between a mechanism for synchronously rotating 16 and an elastic member 21. As shown in particular in FIGS. 2 to 4, the mechanism for generating friction torque 30 consists of a first mechanism for generating friction torque 30a on the first hinge shaft 10 side and a second mechanism for generating friction torque 30b on the second hinge shaft 12 side. The first mechanism for generating friction torque 30a comprises a first friction washer 32, wherein the second deformed shaft portion 10f of the first hinge shaft 10 passes through and engages with a first deformed insertion hole 32a provided at a center in an axial direction of the first friction washer, so that the first friction washer is provided between a gear supporting member 19 and a cam plate member 31. The first mechanism for generating friction torque 30a further comprises a first elastic member 21a as above described. In the meantime, a waffle-knurl pattern portion 32b is provided on the cam plate member 31 side of the first friction washer 32.

The second mechanism for generating friction torque 30b comprises a second friction washer 33, wherein the second deformed shaft portion 12f of the second hinge shaft 12 passes through and engages with a second deformed insertion hole 33a provided at a center in an axial direction of the second friction washer, so that the second friction washer is provided between a gear supporting member 19 and a cam plate member 31. The second mechanism for generating friction torque 30b further comprises a second elastic member 21b as above described. In the meantime, a waffle-knurl pattern portion 33b is provided on the cam plate member 31 side of the second friction washer 33. Still further, though a rotation of a first friction washer 32 is restrained by a first hinge shaft 10, and the second friction washer 33 by the second hinge shaft 12, both friction washers can respectively slide in an axial direction.

Next, a mechanism for sucking 35 is provided next to a mechanism for generating friction torque 30, in this manner between this and an elastic member 21. The mechanism for sucking 35 consists of a first mechanism for sucking 35a on the first hinge shaft 10 side (above) and a second mechanism for sucking 35b on the second hinge shaft 12 side (below). First, the first mechanism for sucking 35a comprises a first A cam concave portion 31c and a first B cam concave portion 31d, each having a circular arc shape and provided outward on one side of a third A bearing hole 31a (above) of a cam plate member 31 also functioning as third joint member. The first mechanism for sucking 35a further comprises a first cam follower 36, wherein a second deformed shaft portion 10f of a first hinge shaft 10 passes through and engages with a deformed insertion hole 36a of the first cam follower, so that the second deformed shaft portion is restrained by the deformed insertion hole; the first cam follower further comprises a larger first A cam convex portion 36b and a smaller first B cam convex portion 36c, of which the first A cam convex portion is provided opposite to the first A cam concave portion 31c, while the first B cam convex portion to the first B cam concave portion 31d. Still further, the first mechanism for sucking 35a comprises a first elastic member 21a in contact with the first cam follower 36, wherein the first elastic member 21a brings the first cam follower 36 into a pressurized contact with the cam plate member 31.

As per a second mechanism for sucking 35b, it comprises a second A cam concave portion 31e and a second B cam concave portion 31f, each having a circular arc shape and provided outward on one side of a third A bearing hole 31b (below) of a cam plate member 31 also functioning as third joint member. The second mechanism for sucking 35b further comprises a second cam follower 37, wherein a second deformed shaft portion 12f of a second hinge shaft 12 passes through and engages with a deformed insertion hole 37a of the second cam follower, so that the second deformed shaft portion is restrained by the deformed insertion hole; the second cam follower further comprises a larger second A cam convex portion 37b and a smaller second B cam convex portion 37c, of which the second A cam convex portion is provided opposite to a second A cam concave portion 31e, while the second B cam convex portion to a second B cam concave portion 31f. Still further, though a rotation of a first cam follower 36 is restrained by a first hinge shaft 10, and the second cam follower 37 by the second hinge shaft 12, both cam followers can respectively slide in an axial direction.

Figure 12A:
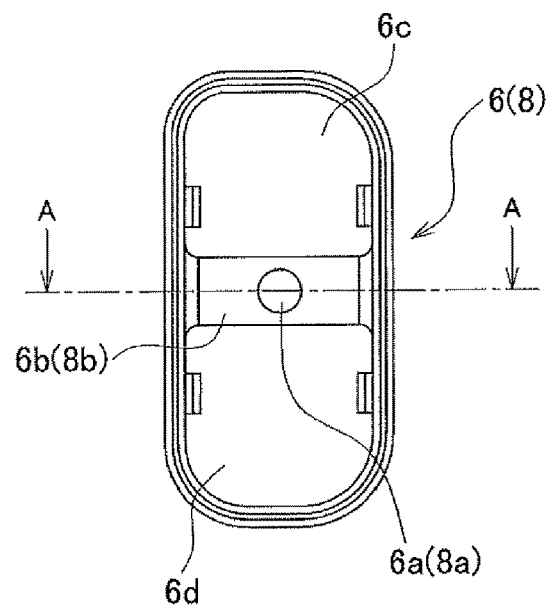
FIG. 12 show a hinge case of a biaxial hinge according to the invention, FIG. 12A being a side view and FIG. 12B being a cross section in A-A line of FIG. 12A.
Figure 12B:
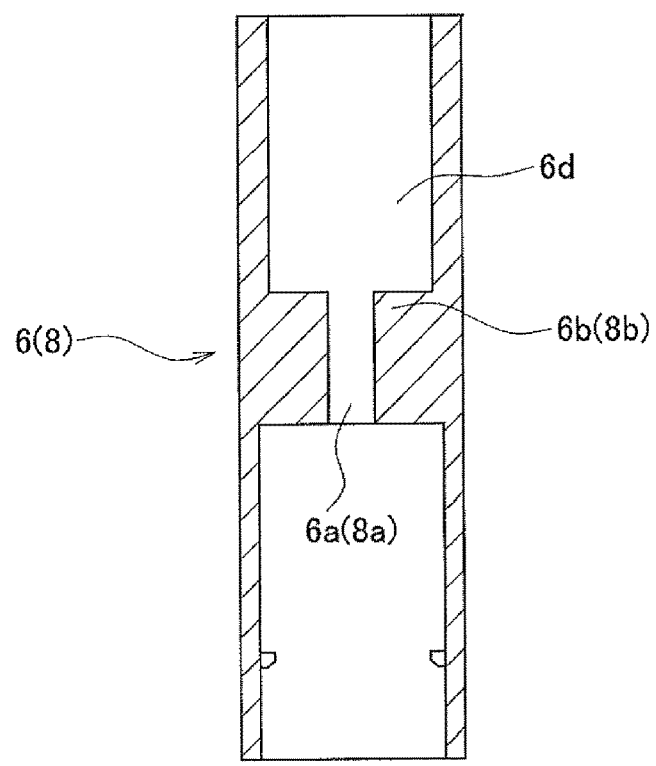

In the meantime, it is recommended to attach a hinge case 6 to a biaxial hinge 4, wherein the hinge case houses a mechanism for controlling rotation 4a including elements from a stopper plate 14 also functioning as a first joint member to an elastic member 21. The hinge case 6 has a cross section in the shape of oblong hole and a cylindrical contour, in particular as shown in FIGS. 2, 4, and 12. An attaching portion 6b is provided in the interior of the hinge case, wherein an attaching hole 6a is provided such that such hole crosses the center of the hinge case. A first insertion hole 6c is provided above the attaching portion 6b, wherein a first mechanism for generating friction torque 30a and a first mechanism for sucking 35a on the first hinge shaft 10 side of the biaxial hinge 4 pass through the first insertion hole, while a second insertion hole 6d is provided below the attaching portion 6b, wherein a second mechanism for generating friction torque 30b and a second mechanism for sucking 35b on the second hinge shaft 12 side of the biaxial hinge 4 pass through the second insertion hole. Still further, a stopper portion 15, a mechanism for synchronously rotating 16 are housed into a space toward portions of the hinge shafts not housed into the hinge case, while a mechanism for generating friction torque 30 and a mechanism for sucking 35 are both housed into a space beyond the attaching portion 6b toward the tip ends of the hinge shafts housed into the hinge case. In this manner, these mechanisms are altogether attached to a female screw hole 31g provided on a cam plate member 31.

Still further, a part of a hinge case 6 is housed into a housing concave portion 2b provided on a first casing 2 of a notebook PC 1 and a remaining part of the hinge case 6 into a housing concave portion 3b provided on a second casing 2, when the first casing 2 of a notebook PC 1 is closed relative to the second casing 3, especially as shown in FIG. 2, with both casings are coupled to each other via a biaxial hinge 4 according to the invention. Still further, a hinge case 8 of another biaxial hinge 5 has an identical structure.

In the following, reference is made to an operation of the biaxial hinge 4 as described above. First, the biaxial hinge 4 according to the present invention is a biaxial hinge for opening and closing the first casing 2 and the second casing 3 relative to each other, wherein the both casings constitute the notebook PC 1 being an example of terminal device. The biaxial hinge is characterized in that the first hinge shaft 10 attached to the first casing 2 side via the first attaching plate 11 is coupled in parallel to the second hinge shaft 12 attached to the second casing 3 side via the second attaching plate 13, by mechanism of the stopper plate member 14 also functioning as the first joint member, the gear supporting member 19 also functioning as the second joint member and the cam plate member 31 also functioning as the third joint member, such that both hinge shafts can rotate. When the first casing 2 is opened and closed by the operator relative to the second casing 3 (or vice versa), the mechanism for synchronously rotating 16 simultaneously opens and closes the casing not assuming opening and closing operations yet, so that the opening and closing operation can be quickly and easily completed.

Figure 14:
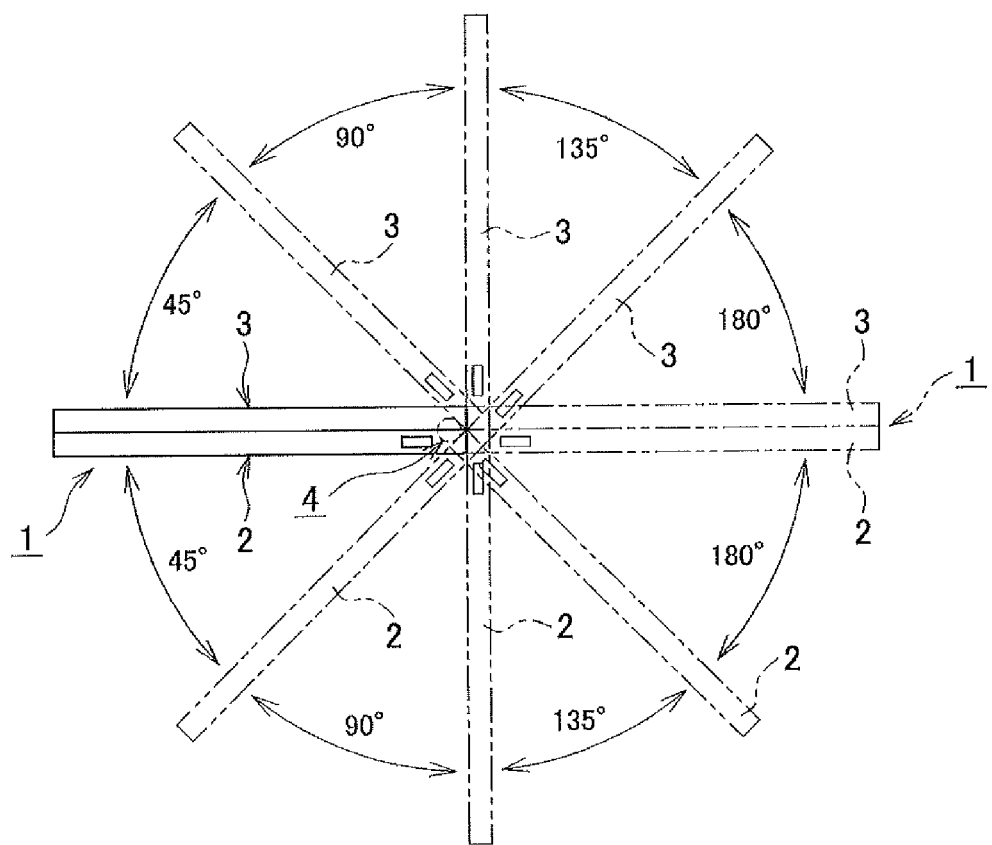
FIG. 14 is an explanatory view illustrating an operation of a biaxial hinge according to the invention.

Namely, reference is first made to how the second casing 3 which is e.g. held by one hand of the user opens from its closed state, as shown by the solid line in FIG. 14, relative to the first casing 2 which is e.g. held by another hand of the user. The hand holding the second casing 3 rotates clockwise, and the first hinge shaft 10 first rotates clockwise and the first gear 17 does so in the same direction (clockwise). On the other hand, when the first gear 17 rotates clockwise, the intermediate gear 20 rotates counterclockwise via the upper bevel tooth portion 20*c* of the intermediate gear 20 meshed with the first bevel tooth portion 17*b* of the first gear 17 rotating together with first hinge shaft 10, and the second gear 18 attached to the second hinge shaft 12, wherein the second bevel tooth portion 18*b* of the second gear 18 meshes with the lower bevel tooth portion 20*d* of the intermediate gear 20, rotates counterclockwise as well. In this manner, the first hinge shaft 10 rotates in a direction opposite to the rotation direction of the second hinge shaft 12, and therefore the first casing 2 rotates at the same time as the second casing 3 as well as in a direction opposite to the rotation direction of the latter, which is the opening and closing operation of both casings. Accordingly, as long as the first hinge shaft 10 rotates, the opening and closing operation of the first casing 2 and the second casing 3 can be more easily and quickly completed than in case of a conventional biaxial hinge wherein a rotation of the second hinge shaft 12 is arrested by the mechanism for selectively restricting rotation. In this manner, an improved operability is assured.

When either the first hinge shaft 10 or the second hinge shaft 12 has rotated 180 degrees from its closed state, a rotation of the hinge shaft having rotated to this angle is arrested by the first stopper portion 15*a* or the second stopper portion 15*b*, and at the same time, a rotation of the other hinge shaft is also arrested, as shown in FIG. 13. The action which takes place during the opening operation also follows the reverse procedures during the closing operation from the fully-opened state of the first casing 2 and the second casing 3.

Next, FIG. 14 shows by the imaginary line how the first casing 2 has rotated clockwise to open 180 degrees relative to the second casing 3. Since the first A cam convex portion 36*b* and the first B cam convex portion 36*c* provided on the first cam follower 36 of the first mechanism for sucking 35*a* fall into the first A cam concave portion 31*c* and the first B cam concave portion 31*d* slightly before an opening angle of 180 degrees, the first casing 2 automatically reaches an opening angle of 180 degrees relative to the second casing 3. The first mechanism for sucking 35*a* also operates, when the first casing 2 closes from 180 degrees to 0 degree. Alternatively, both operations are also possible. Still further, the mechanism for sucking 35 maintains the closed state of the first casing 2 and the second casing 3 without allowing the first casing 2 and the second casing 3 to automatically open relative to each other, even if no mechanism for latching is provided.

Still further, the first casing 2 and the second casing 3 synchronously open relative to each other, respectively rotating toward opposite directions, so that the former is opened 360 degrees in total relative to the latter. In this state, as shown by the imaginary line in FIG. 14, the first casing 2 overlaps the second casing 3, with the respective surfaces now facing each other being opposite to the ones facing each other in the closed state. Here, as per the first hinge shaft 10, the first stopper projection 14*c* of the stopper plate 14 also functioning as first joint member of the stopper portion 15 abuts against the first projection 10*h* of the first hinge shaft, as shown in FIG. 13B, while as per the second hinge shaft 12, the second stopper projection 14*d* against the second projection 12*h* of the second hinge shaft. In this manner, a further rotation of the first hinge shaft 10 and the second hinge shaft 12 is arrested.

When the first casing 2 and the second casing 3 open and close relative to each other as described above, the first hinge shaft 10 and the second hinge shaft 12 assume rotating operation one after another; at this point, the first mechanism for generating friction torque 30*a* and the second mechanism for generating friction torque 30*b* simultaneously operate, so that the above-mentioned mechanism generate a friction torque on the first friction washer 32 and the second friction washer 33 at their respective contact surfaces with the gear supporting member 19 also functioning as the second joint member and the cam plate member 31 also functioning as the third joint member. In this manner, these mechanisms can assure a stable stopping function of the first casing 2 and the second casing 3 at any angle during the rotation of the casings.

Still further, the stopper portion 15 consists of the first stopper portion 15*a* and the second stopper mechanism 15*b*. As described above and as shown in FIGS. 13A and 13B, as per the first stopper portion 15*a*, when the first hinge shaft 10 has rotated 180 degrees in total, its first projection 10*h* abuts against the first stopper projection 14*c* provided on the stopper plate 14 also functioning as the first joint member, in order to restrict a further rotation of the first hinge shaft; as per the second stopper portion 15*b*, when the second hinge shaft 12 has rotated 180 degrees in total, its second projection 12*h* abuts against the second stopper projection 14*d* provided on the stopper plate 14 also functioning as the first joint member, in order to restrict a further rotation of the second hinge shaft.

Still further, as per the mechanism for sucking 35, the first mechanism for sucking 35*a* and the second mechanism for sucking 35*b* take effect slightly before opening angles of 0 and 180 degrees, namely the first A cam convex portion 36*b* and the first B cam convex portion 36*c* of the first cam follower 36 respectively fall into the first A cam concave portion 31*c* and the first B cam concave portion 31*d* of the cam plate member 31 also functioning as third joint member; on the other hand, the second A cam convex portion 37*b* and the second B cam convex portion 37*c* of the second cam follower 37 respectively fall into the second A cam concave portion 31*e* and the second B cam concave portion 31*f* of the cam plate member 31 also functioning as third joint member. In this manner, the second mechanism for sucking performs a sucking action and rotatably urges the first casing 2 and the second casing 3 to automatically rotate relative to each other in an opening direction.

Further in addition to the original application of the notebook PC 1, a variety of additional applications is also available, such as by synchronously rotating the first casing 2 and the second casing 3 relative to each other via the biaxial hinge 4 and folding into the shape substantially of the letter L and into the angle shape, as well as by allowing the both casings to overlap each other to form a flat tablet and turning the second casing 3 to the operator, such that the notebook PC has a function as a tablet PC.

In the meantime, other embodiments include, though not shown in the drawings, the use of spur gears for a first gear 17 and a second gear 18, whereby the gears are so designed that they directly mesh with each other, without intervention of an intermediate gear. Still further, the gears can be so designed that they synchronously rotate, one in a direction opposite to the other. Still further, a first elastic member 22 and a second elastic member 25 used for the elastic member 21 can be replaced with compression coil springs and elastic materials made of synthetic resin such as rubber. Still further, even without the hinge cases 6, 8, the function of the biaxial hinges 4, 5 is not particularly impaired, but the hinge cases 6, 8 in use have an advantage that the biaxial hinges 4, 5 as attached to the notebook PC 1 have a neat appearance, since the hinge cases prevent the stopper portion 15 from an exposure to the outside, and this also applies to the mechanism for selectively restricting rotation 16, the mechanism for generating friction torque 30 and mechanism for sucking 35.

The present invention is constructed as described above, so that it is suitable for use in a terminal device such as a notebook PC and the like, wherein a first casing and a second casing synchronously open relative to each other, and both casings open and close relative to each other in a range of 360 degrees. The present invention is particularly suitable for use in a notebook PC also functioning as a tablet PC.

What is claimed is:

1. A biaxial hinge which couples a first casing with a second casing, said first casing being thereby capable of opening and closing relative to said second casing, said biaxial hinge comprising:

a first hinge shaft attached to said second casing via a first attaching plate;

a second hinge shaft attached to said first casing via a second attaching plate;

a mechanism for controlling rotation including a stopper portion, a synchronous rotation mechanism, a mechanism for generating friction torque, a mechanism for sucking and an elastic mechanism which are sequentially provided from one side end of each of said first hinge shaft and said second shaft;

said stopper portion comprising a stopper plate having a first bearing hole and a second bearing hole each bearing said first hinge shaft and said second hinge shaft so as to rotate, a first projection and a second projection each provided on the outside of said first bearing hole and said second bearing hole, and a first projection and a second projection each provided on each radial direction of said first hinge shaft and said second hinge shaft;

said synchronous rotating mechanism comprising a first bevel gear and second bevel gear each mounted on said first hinge shaft and said second hinge shaft, a gear support member having an upper projecting portion and a lower projecting portion each pass through said first hinge shaft and said second hinge shaft, an intermediate gear comprising an upper supporting shaft inserted rotatable in a first shaft supporting groove provided on a lower side of said upper projecting portion of a gear supporting member, a lower supporting shaft inserted rotatable in a second shaft supporting groove provided on an upper side of a lower projecting portion of the gear supporting member, an upper bevel tooth portion provided at an upper part of the intermediate gear and a lower bevel tooth portion provided at a lower part of the intermediate gear, said intermediate bevel gear meshing with said first bevel gear and said second bevel gear;

said mechanism for generating friction torque consisting of a first mechanism for generating friction torque and a second mechanism for generating friction torque, said first mechanism for generating friction torque having a first friction washer attached to said first hinge shaft and provided between said gear supporting member and a cam plate member, said second mechanism for generating friction torque having a second friction washer attached to said second hinge shaft and provided between said gear supporting member and a cam plate member;

said mechanism for sucking comprising a first mechanism for sucking and a second mechanism for sucking, said first mechanism for sucking having a first cam portion provided around an insertion hole of said first hinge shaft and provided on said cam plate, a first cam follower abutting against said first cam portions which is slidably attached to said first hinge shaft, and said second mechanism for sucking having second cam portion provided around an insertion hole of said second hinge shaft and provided on said cam plate, a second cam follower abutting against said second cam portion which is slidably attached to said second hinge shaft; and said elastic mechanism acting on said mechanism for generating friction torque and said mechanism for sucking, said elastic mechanism comprising a first elastic mechanism and a second elastic mechanism;

said first elastic mechanism comprising a plurality of first disk springs attached to said first hinge shaft adjacent to said first cam follower and in contact with said plurality of first disk springs, a first presser washer attached to the first hinge shaft, and a first fastening nut screwed to the first hinge shaft in contact with said first presser washer, said second elastic mechanism comprising a plurality of a second disk springs attached to said second hinge shaft adjacent to said second cam follower, a second presser washer attached to said second hinge shaft, and a second fastening nut screwed to said second hinge shaft in contact with said second presser washer.

2. A terminal device, the biaxial hinge according to claim 1 being used therein.

3. The biaxial hinge according to claim 1, said mechanism for synchronously rotating further comprising an upper slip washer and a lower slip washer each mounted on said first hinge shaft and said second hinge shaft, and each provided between said first bevel gear and upper projecting portion and second bevel gear and lower projecting portion.

4. The biaxial hinge according to claim 1, said stopper portion consisting of a first stopper portion and a second stopper portion;

said first stopper portion comprising:

a first A bearing hole provided in an upper part of a stopper plate, said first hinge shaft passing through said first A bearing hole, a first stopper projection provided on the outside of said first A bearing hole; and a first projection provided on said first hinge shaft side, said first projection abutting against said first stopper projection or not, depending on a rotation angle of said first hinge shaft;

said second stopper portion comprising;

a first B bearing hole provided in a lower position of said stopper plate, said second hinge shaft passing through said first B bearing hole, a second stopper projection provided on the outside of said first B bearing hole; and a second projection provided on said second hinge shaft side, said second projection abutting against said second stopper projection or not, depending on a rotation angle of said second hinge shaft.

5. The biaxial hinge according to claim 1, said mechanism for generating friction torque consisting of a first mechanism for generating friction torque and a second mechanism for generating friction torque;

said first mechanism for generating friction torque comprising:
a first friction washer attached to said first hinge shaft, a rotation of said first friction washer being restrained, said first friction washer being provided between a gear supporting member and a cam plate member; and
a first elastic member provided on said first hinge shaft for bringing said gear supporting member and said cam plate member into pressurized contact with said first friction washer;
said second mechanism for generating friction torque comprising:
a second friction washer attached to said second hinge shaft, a rotation of said second friction washer being restrained, said second friction washer being provided between a gear supporting member and said cam plate member; and
a second elastic member provided on said second hinge shaft for bringing said gear supporting member and said cam plate member into pressurized contact with second friction washer.

6. The biaxial hinge according to claim 1, the mechanism for sucking consisting of a first mechanism for sucking and a second mechanism for sucking;
said first mechanism for sucking comprising:
a first A cam concave portion and a first B cam concave portion, each of said first A cam concave portion and said first B cam concave portion having a substantially circular arc shape, provided outside on one side of said third A bearing hole of a cam plate member also functioning as third joint member, said first hinge shaft rotatably passing through said third A bearing hole;
a first cam follower comprising a first A cam convex portion and a first B cam convex portion on a side facing said first A cam concave portion and said first B cam concave portion, a rotation of said first cam follower being restrained by said first hinge shaft and said first cam follower being thereby attached to said first hinge shaft; and
a first elastic member for bringing said first A cam concave portion into a pressurized contact with said first A cam convex portion on one hand, and said first B cam concave portion into a pressurized contact with said first B cam convex portion on the other;
said second mechanism for sucking comprising:
a second A cam concave portion and a second B cam concave portion, each of said second A cam concave portion and said second B cam concave portion having a substantially circular arc shape, provided outside on one side of said third B bearing hole of a cam plate member also functioning as third joint member, said second hinge shaft rotatably passing through said third B bearing hole;
a second cam follower comprising a second A cam convex portion and a second B cam convex portion on a side facing said second A cam concave portion and said second B cam concave portion, a rotation of said second cam follower being restrained by said second hinge shaft and said second cam follower being thereby attached to said second hinge shaft; and
a second elastic member for bringing said second A cam concave portion into a pressurized contact with said second A cam convex portion on one hand, and said second B cam concave portion into a pressurized contact with said second B cam convex portion on the other.

7. A terminal device, the biaxial hinge according to claim 1 being used therein.

* * * * *